(12) United States Patent
Zhang et al.

(10) Patent No.: US 11,119,647 B2
(45) Date of Patent: Sep. 14, 2021

(54) DETECTING GESTURE STRUGGLE (71) Applicant: International Business Machines Corporation, Armonk, NY (US)

(72) Inventors: Jun Wei Zhang, Shanghai (CN); Lin Ni, Shanghai (CN); Jun Liao, Shanghai (CN); Yue Cui Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/556,347

(22) Filed: Aug. 30, 2019

(65) Prior Publication Data
US 2021/0064228 A1 Mar. 4, 2021

(51) Int. Cl.
G06F 3/0482 (2013.01)
G06F 3/0488 (2013.01)
H04L 29/08 (2006.01)

(52) U.S. Cl.
CPC .......... *G06F 3/04883* (2013.01); *H04L 67/22* (2013.01); *H04L 67/10* (2013.01)

(58) Field of Classification Search
CPC .......................... G06F 3/0482; G06F 3/04883
See application file for complete search history.

(56) References Cited

U.S. PATENT DOCUMENTS

| 5,999,908 | A | 12/1999 | Abelow |
| 8,294,669 | B2 | 10/2012 | Partridge et al. |
| 2007/0271375 | A1 | 11/2007 | Hwang |
| 2009/0128505 | A1* | 5/2009 | Partridge ............ G06F 3/04883 345/173 |
| 2011/0111384 | A1* | 5/2011 | Dietrich .................. G09B 7/00 434/350 |
| 2016/0274786 | A1* | 9/2016 | Hernandez .............. G06F 3/017 |
| 2017/0060412 | A1 | 3/2017 | Hernandez et al. |
| 2017/0161478 | A1* | 6/2017 | Stavrou ................. G06F 21/316 |
| 2017/0285755 | A1* | 10/2017 | Churchill ............... G06N 20/00 |
| 2018/0121608 | A1* | 5/2018 | Gross ..................... G16H 20/30 |

OTHER PUBLICATIONS

Disclosed Anonymously, Mar. 3, 2017.*
(Continued)

*Primary Examiner* — Rayeez R Chowdhury
(74) *Attorney, Agent, or Firm* — Kelli D. Morin (57) ABSTRACT

A computer implemented method is disclosed. The method includes obtaining, by at least one processor, data of user interaction with an application in a user session in a given computing environment. The method further includes identifying a user gesture interacting with a user interface of the application on a screen of a computing device based on the data. The method further includes calculating a struggle factor score for the user gesture based on the data. The method further includes comparing the struggle factor score with a baseline value, wherein the baseline value is derived from historical information of past user sessions in a computer environment like the given computing environment. The method further includes determining that the user gesture indicates a user struggle in response to a determination that the struggle factor score is above the baseline value.

18 Claims, 6 Drawing Sheets

| Percentile / Struggle Factor Score | 25th | 50th | 75th | 95th | maximum |
|---|---|---|---|---|---|
| slider ratio (%) | 105 | 215 | 320 | 440 | 580 |
| dwell time (minutes) | 2 | 5 | 10 | 15 | 25 |
| repeated gesture (times) | 1 | 3 | 6 | 10 | 20 |
| single-handed opposite gesture (times) | 0 | 2 | 4 | 5 | 15 |

(56) References Cited

OTHER PUBLICATIONS

Anonymous, "System and method to track user struggle using face expressions," https://priorart.ip.com/IPCOM/000249570, IP.com Prior Art Database Technical Disclosure, IP.com No. IPCOM000249570D, Mar. 3, 2017, 3 pgs.

IBM, "IBM Tealeaf," https://www.ibm.com/us-en/marketplace/session-replay-and-interaction-analytics, printed Jul. 24, 2019, 1 pg.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

| 501 | 502 | 503 | 504 |
|---|---|---|---|
| UI-Type | APP Platform | Device Model | Industry Sector |
| Checkout page | Firefox web | iPhone 7 | retail |

| session | slider ratio (%) | dwell time (in minutes) | repeated gesture (times) | single-handed opposite gesture (times) |
|---|---|---|---|---|
| 1 | 210 | 15 | 2 | 10 |
| 2 | 220 | 5 | 2 | 5 |
| ... | | | | |
| ... | | | | |

| Percentile / Struggle Factor Score | 25th | 50th | 75th | 95th | maximum |
|---|---|---|---|---|---|
| slider ratio (%) | 105 | 215 | 320 | 440 | 580 |
| dwell time (minutes) | 2 | 5 | 10 | 15 | 25 |
| repeated gesture (times) | 1 | 3 | 6 | 10 | 20 |
| single-handed opposite gesture (times) | 0 | 2 | 4 | 5 | 15 |

DETECTING GESTURE STRUGGLE

BACKGROUND

The present disclosure relates generally to the field of user interaction analysis, and more particularly to methods, systems, and computer program products for analyzing screen gestures representing user struggles in interacting with the user interfaces.

User interfaces (UIs) are provided on screens of computing devices, such as smart phones, to provide a way for users of the devices to interact with software and/or applications (apps) that are being run on the devices. A smart phone may be equipped with apps provided by different industries, such as retail, hotel, and airlines, and each of these apps may utilize a UI. A user may interact with the UIs on a touch screen of the smart phone to conduct transactions, for example, to finish a payment via an app running on the smart phone.

Technologies have been developed to capture real-time user sessions to understand user interaction with apps. Such technologies answer questions about what a user is doing, or seeing, on each page during a user session. This information about user interaction can be used to detect user gesture struggles.

SUMMARY

Embodiments of the present disclosure include a method, computer program product, and system for analyzing screen gestures representing user struggles in interacting with the user interfaces.

According to some embodiments of the present disclosure, a computer implemented method includes obtaining, by at least one processor, data of user interaction with an application in a user session in a given computing environment. The computer implemented method further includes identifying a user gesture interacting with a user interface of the application on a screen of a computing device based on the data. The computer implemented method further includes calculating a struggle factor score for the user gesture based on the data. The computer implemented method further includes comparing the struggle factor score with a baseline value, wherein the baseline value is derived from historical information of past user sessions in a computer environment like the given computing environment. The computer implemented method further includes determining that the user gesture indicates a user struggle in response to a determination that the struggle factor score is above the baseline value.

According to another embodiment of the present disclosure, a system includes a computer-readable storage medium and at least one processor coupled to the computer-readable storage medium. The computer-readable storage medium includes instructions, and the at least one processor is configured such that, in response to executing the instructions, the at least one processor performs the method set forth above.

According to another embodiment of the present disclosure, a computer program product includes a computer readable storage medium having program instructions embodied therewith. The program instructions are executable by a processor to cause the processor to perform the method set forth above.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Throughout the drawings, same or similar reference numerals represent the same or similar elements.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the present disclosure.

DETAILED DESCRIPTION

Aspects of the present disclosure relate generally to the field of user interaction analysis, and in particular to methods, systems, and computer program products for analyzing screen gestures representing user struggles in interacting with the user interfaces. While the present disclosure is not necessarily limited to such applications, various aspects of the disclosure may be appreciated through a discussion of various examples using this context.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
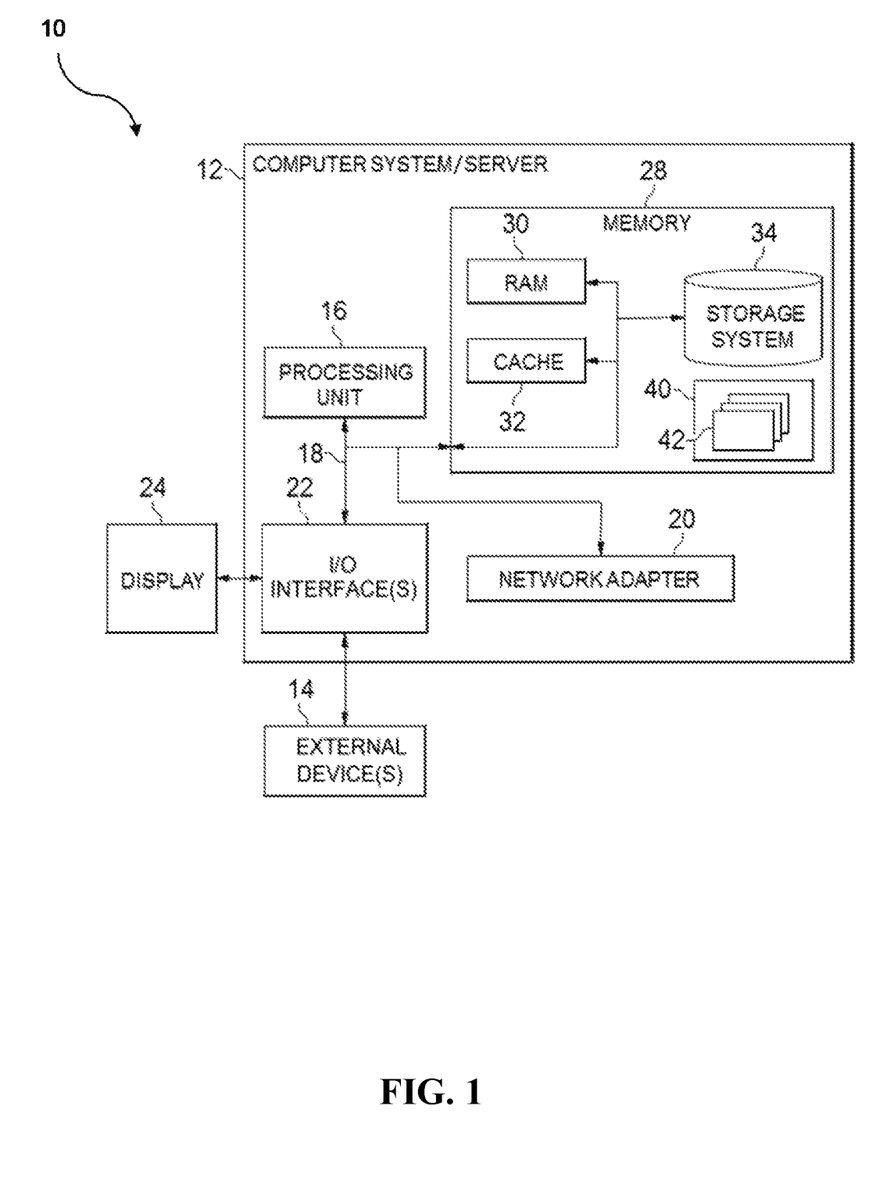
FIG. 1 depicts a cloud computing node according to some embodiments of the present disclosure.

Referring now to FIG. 1, a schematic of an example of a cloud computing node 10 is shown. Cloud computing node 10 is only one example of a suitable cloud computing node and is not intended to suggest any limitation as to the scope of use or functionality of embodiments of the present disclosure. Regardless, cloud computing node 10 may be used in implementing one or more of the methods, tools, and modules, and any related functions, described herein, in accordance with embodiments of the present disclosure.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
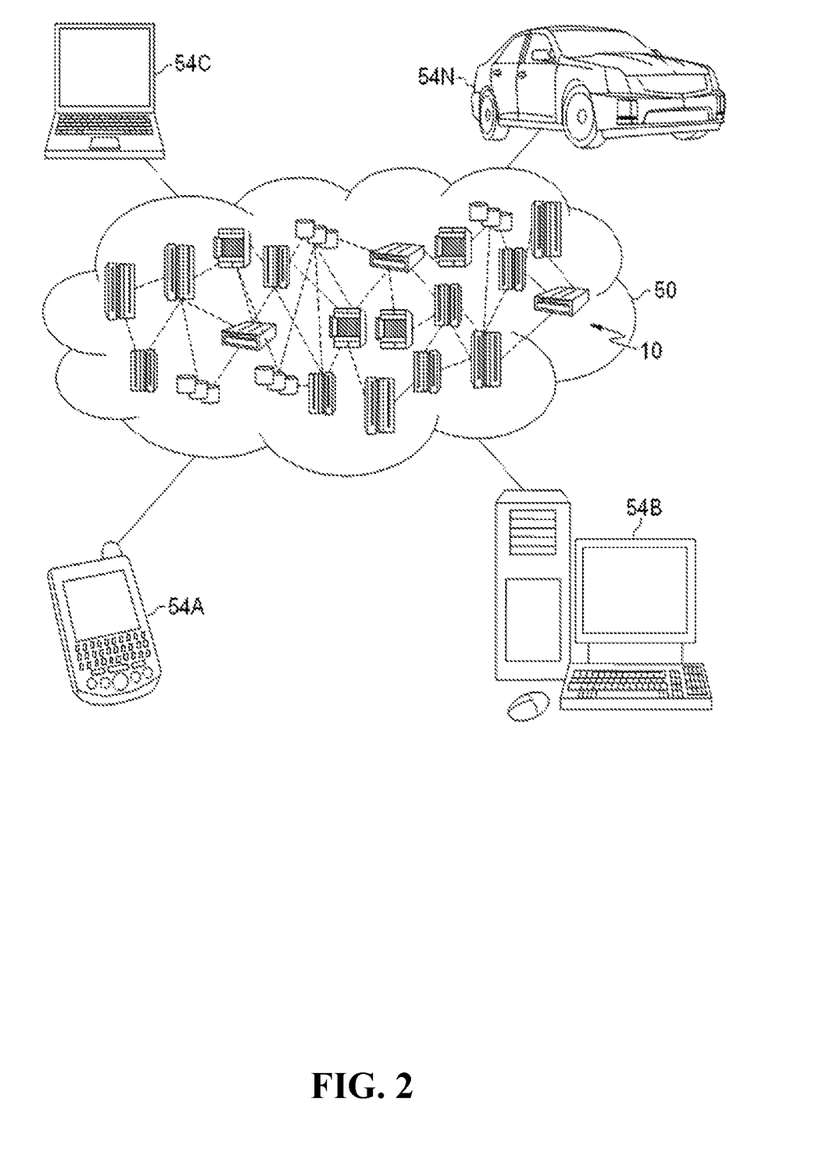
FIG. 2 depicts a cloud computing environment according to some embodiments of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
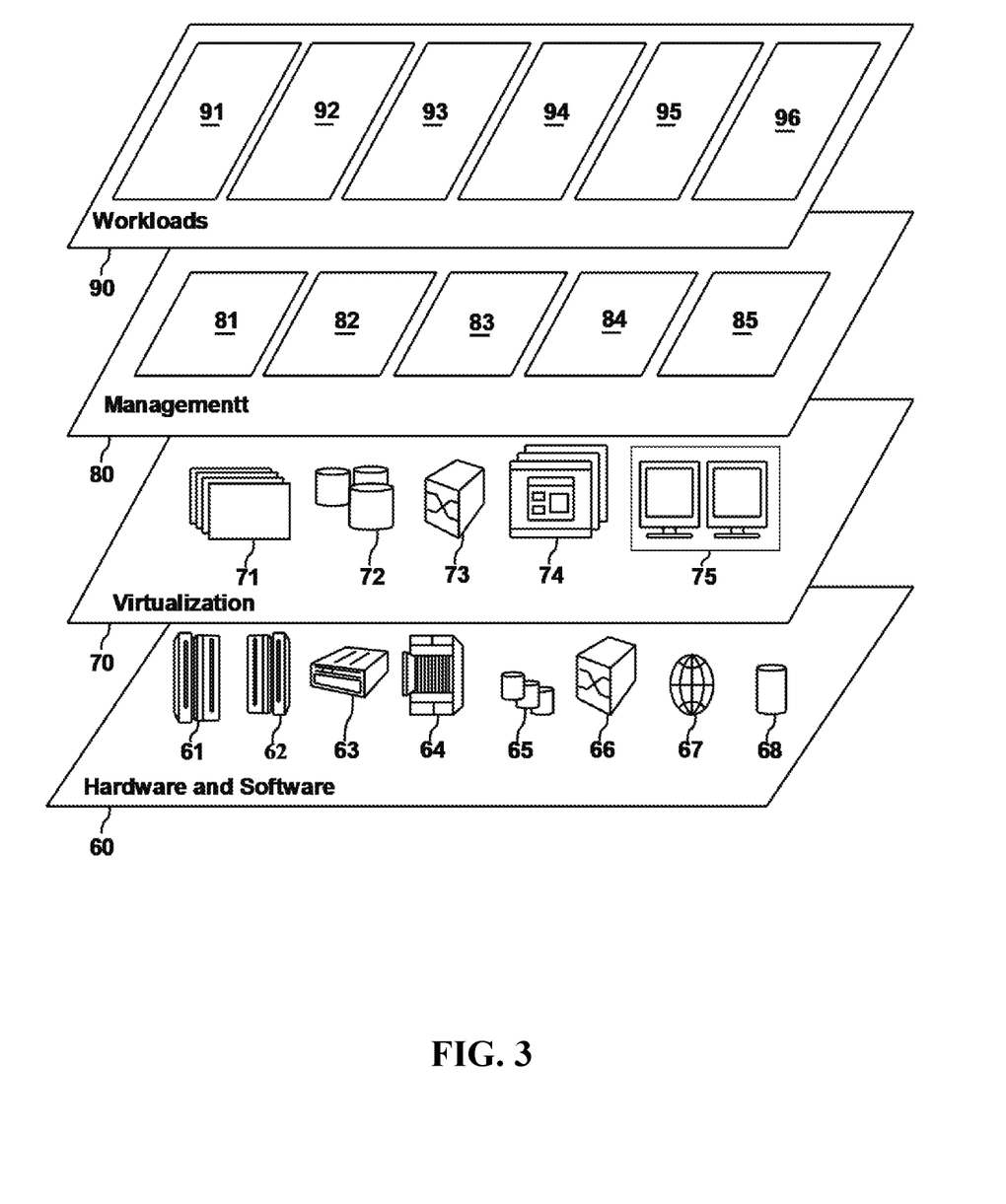
FIG. 3 depicts abstraction model layers according to some embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting gesture struggle 96.

With reference now to accompanying drawings, exemplary embodiments of the present disclosure will be described. The exemplary embodiments are directed to a method, system and computer program product for detecting gesture struggle.

It should be noted that the processing of the method for detecting gesture struggle of the present disclosure may be implemented by computer system/server 12 of FIG. 1.

The present disclosure proposes a method for detecting a gesture struggle by analyzing user gestures on UIs among most sessions, calculating the normal behavior criteria and detecting outliers. In view of existing technologies, there is room for improved automatic struggle analysis on users' gestures on user interfaces of computing devices to enhance the user experience. It is desirable for UI designers to have improved technologies that accurately detect user struggle in interacting with UIs associated with particular computing environments.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 4:
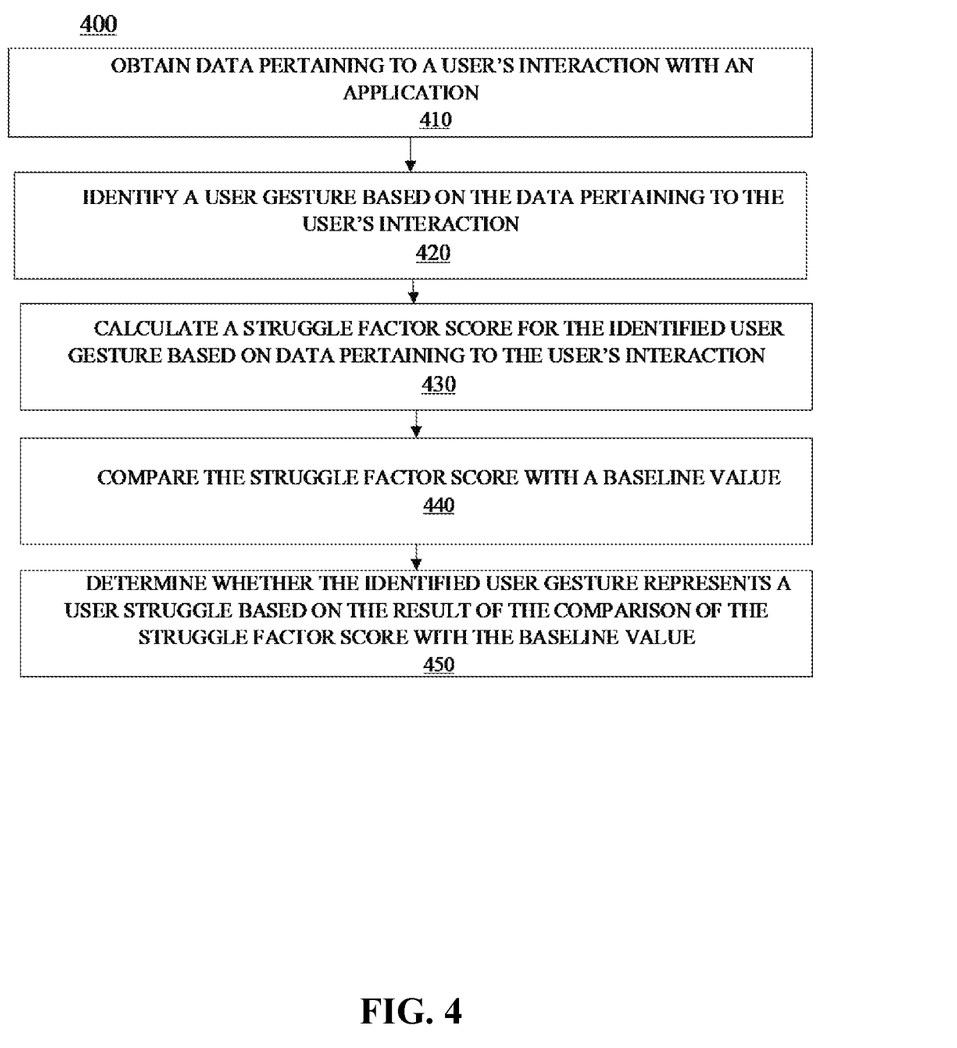
FIG. 4 is a flowchart of the general process of an example method according to some embodiments of the present disclosure.

FIG. 4 depicts a flowchart of a computer-implemented method 400 for detecting a user gesture struggle according to some embodiments of the present disclosure. The method generally comprises steps 410 to 450, each of which may be performed by at least one processor, as follows. Step 410 of the method comprises obtaining data pertaining to a user's interaction with an application in a given user session in a given computing environment. Step 420 of the method comprises identifying a "user gesture" based on the data pertaining to the user's interaction. A "user gesture" is a gesture that the user performs to interact with a UI on a screen of a computing device. Step 430 of the method comprises calculating a "struggle factor score" for the user gesture based on the data pertaining to the user's interaction. A "struggle factor score" is a numerical value which represents the extent of a possible struggle that the user experiences while interacting with the UI. Step 440 of the method comprises comparing the struggle factor score with a baseline value, wherein the baseline value is derived from historical information of past user sessions in a computing environment that is similar to the given computing environment. Finally, step 450 of the method comprises determining whether the user gesture represents a user struggle based on the result of the comparison of the struggle factor score with the baseline value. In particular, if the struggle factor score is greater than the baseline value, then step 450 of the method determines that the user gesture does represent a user struggle. Conversely, if the struggle factor score is less than the baseline value, then step 450 of the method determines that the user gesture does not represent a user struggle. Some embodiments of each step of method 400 will be described in the following paragraphs.

As noted above, method 400 starts with step 410, which comprises obtaining data pertaining to a user's interaction with an app in a given user session in a given computing environment. It is to be assumed that in a given user session, a user is interacting with a UI provided by an app running on a computing device. In the context of the present disclosure, it may be said that there is a user interaction with the app via the UI in a user session. The user interaction may be detected, and the data pertaining to the user interaction may be captured by the computing device. Such data in different sessions may be stored in a storage, such as a database, either locally or remotely. For brevity, the term "data pertaining to user interaction" is also referred to as "data of user interaction" or "user interaction data" in the following description.

Specifically, by way of example, assume that a user is in an online-shopping session, and the user interacts with a "checkout" page, which is a form of UI, of a web-based app on a touch screen of a smart phone functioning as a computing device. The checkout page is generated or provided by the web-based app of the "retail" industry sector. The user may use his or her hand(s) to serve as an input device in order to interact with elements in the UI, such as the checkout page, during the online-shopping session. The actions of the user's hand(s) may be captured by sensors in the smart phone. Signals sensed by the sensors may be processed, resulting in a part of the user interaction data.

In step 410 of the method 400, the user interaction data may be obtained from the storage (e.g., a computer-readable storage medium in a database) as described above. Alternatively, the user interaction data may be obtained directly from the smart phone, which may capture the user interaction data in real time during the user session.

Following step 410, step 420 of the method 400 comprises identifying a user gesture based on the user interaction data. In other words, step 420 of the method includes identifying a gesture that the user has used to interact with a UI of the app on a screen of a computing device based on the user interaction data. As mentioned, known techniques exist for analyzing user interaction data to understand the user behavior. Such techniques may be employed in step 420 to identify any user gesture from the user interaction data obtained in step 410.

There are different types of user gestures that may be used by a user to interact with a UI. Hand operations, in particular, are user gestures that are typically used to interact with a UI of an app on a screen of a computing device. Typical user gestures that are hand operations include "dwelling," "repeated gesture," "single-handed opposite gesture," and "slider," among others.

The term "dwelling" refers to instances wherein one of the user's fingers remains on a given UI element. The element is often an input field such as, for example, text, checkbox, calendar, radio box, email, and the like. The length of time that the user's finger remains on the given UI element may serve as an indicator of abnormal user operation behavior. For example, if the user is visiting a web page and takes much more time on a given text field than other users take on the same text field, there is a high probability that the user is experiencing some struggle in utilizing the UI. The extent of the struggle indicated by the user's dwelling may be measured by a struggle factor score called "dwell time," which refers to the length of time that the dwelling lasts. It shall be appreciated there may be instances wherein dwelling on some UI elements, such as two-dimensional code, is a requirement designed for completing a function, and thus does not necessarily indicate a user struggle.

The term "repeated gesture" refers to instances wherein the user repeats an action (or a "gesture") several times. More specifically, "repeated gesture" refers to subset of instances wherein the user unnecessarily performs a gesture repeatedly with respect to either a page or a UI element, in which case the repeated gesture may be indicative of a struggle in utilizing the UI that the user is experiencing. The extent of the struggle indicated by the user's repeated gesture may be measured by a struggle factor score called "repeated gesture," which refers to a count of the number of times the gesture is repeated.

The term "single-handed opposite gesture" refers to instances wherein the user holds one side of the computing device with one hand and attempts to perform a gesture with the same hand in a location on the screen that is near the opposite side. Assuming that the location on the screen is out of a comfortable zone that is easily accessible for the single hand, this type of gesture struggle exists due to the distance from the side on which the computing device is held to the position where the operation is desired. The extent of a struggle indicated by a user's single-handed opposite gesture may be measured by a struggle factor score called "single-handed opposite gesture," which refers to a count of the number of times that the user attempts to perform opposite side operations.

The term "slider" refers to instances wherein one of the user's fingers taps and holds at a start position on the screen of the computing device, and while maintaining contact with the screen, moves the finger from the start position to an end position on the screen. The pattern of this movement is tracked and can be referred to as a movement pattern. During an interaction with a UI, the movement pattern of a user's finger typically does not include a winding path, such as a back-and-forth path. However, if the movement pattern does contain a winding path, the user's gesture may indicate that the user is experiencing a struggle in the interaction with the UI. As another example, if the speed of the movement of the user's finger slows significantly near the end position, the user's gesture may also indicate that the user is experiencing a struggle in the interaction with the UI. For brevity, user struggles indicated by a winding path and/or a slowing in the user's movement pattern will be referred to as "slider struggle." The extent of a slider struggle may be measured by a struggle factor score called "slider ratio," which represents an extent of the winding path and/or slow-down in the user's movement pattern.

For the following example, assume that in step 420 of the method the user gesture is identified as a slider. In the following paragraphs, the slider gesture is used as an example for the purpose of illustrating subsequent steps 430 to 450 of the method 400. Following identification of the user gesture in step 420, step 430 is performed. Thus, a struggle factor score is calculated for the identified user gesture based on the data obtained in step 410.

For exemplary instances wherein the user gesture is a slider, the struggle factor score for the slider gesture, also referred to as slider ratio, may be calculated according to the formula (1) below:

$$\text{slider ratio} = \frac{\text{total traveled distance}}{\text{ending slider position} - \text{beginning slider position}} \quad (1)$$

In the formula (1), the term "beginning slider position" denotes a position in the user's movement pattern where the slider is started, and the term "ending slider position" denotes a position in the user's movement pattern where the slider is ended. Thus, the denominator in formula (1), "ending slider position-beginning slider position," represents the distance of a straight line between the two positions. In contrast, the numerator in formula (1), "total traveled distance," represents the distance that was actually traveled by the user's finger during the user's movement pattern. Typically, the struggle factor score for a slider gesture is greater than or equal to 100%, because a user's finger generally does not travel in a precisely straight line between a beginning slider position and an ending slider position. Moreover, if the user's finger travels a winding path, the total traveled distance will be even larger relative to the direct line distance. Assume that the slider ratio calculated in the instant example is 250%.

As mentioned above, the slider ratio may serve as an indicator of the extent of a user's struggle with a UI while applying the slider gesture. More specifically, the slider ratio may be directly related to the extent of the struggle. In such instances, a larger slider ratio indicates a more difficult struggle experienced by the user and a smaller slider ratio indicates a less difficult struggle experienced by the user.

As previously discussed, struggle factor scores may be defined for various user gestures. Struggle factor scores for respective user gestures identified may be measured and/or calculated based on user interaction data with predefined schemes according to existing techniques or future techniques.

It is also to be noted that although step 430 and step 420 are described as being performed sequentially, they may alternatively be performed virtually in parallel, or simultaneously.

Following steps 420 and 430, step 440 of the method comprises comparing the calculated struggle factor score with a baseline value, wherein the baseline value is derived from historical information of past user sessions in a computing environment that is similar to the given computing environment. In the instant example, wherein the struggle factor score is slider ratio, the baseline value is a baseline value of the struggle factor score slider ratio derived from historical information of such past user sessions. In the context of the present disclosure, historical information of past user sessions in a computing environment that is similar to the given computing environment refers to information or data aggregated for user sessions that occurred in the past in a computer environment that is similar to the computing environment in which the session of interest in step 410 is occurring. In some embodiments, the historical information is information pertaining only to the user, whereas in other embodiments, the historical information contains information pertaining to one or more other users, in addition to, or instead of, information about the user.

According to some embodiments of the present disclosure, the computing environment may be defined by one or more of the following parameters: the type of UI, the platform of the app, the device model of the computing device, and the industry sector of the app. The type of UI may be, for example, a checkout page, a search page, and the like. The device model may be, for example, iPhone 7®, Huawei Mate 10®, and the like. The platform of the app may be, for example, web, iOS®, Android®, and the like. The industry sector of the app may be, for example, retail, airlines, hotels, and the like.

According to some embodiments of the present disclosure, the one or more parameters defining the computing environment may have been collected along with the user interaction data and stored in association with the user interaction data. The parameters may be used for defining a computing environment in aggregating historical information of past user sessions, as will be further discussed later in the disclosure.

In the instant case, parameters describing the computing environment of the current user session may be collected before step 440 is performed in method 400. Parameters of the given computing environment for the current session are illustrated, as an example, in a table 500 in FIG. 5. As shown, the first row of the table contains one of the following parameter names in each of the four columns: "UI-Type" (501), "App Platform" (502), "Device Model" (503), and "Industry Sector" (504). The second row of the table contains the following parameters in the corresponding columns: <checkout page, Firefox web, iPhone 7, retail. Accordingly, the table 500 indicates that the user is interacting with a "checkout page" type of UI on an "iPhone 7" model computing device, that the app is provided by a "retail" industry sector, and that the app is running on a "Firefox web" platform.

Figure 5:
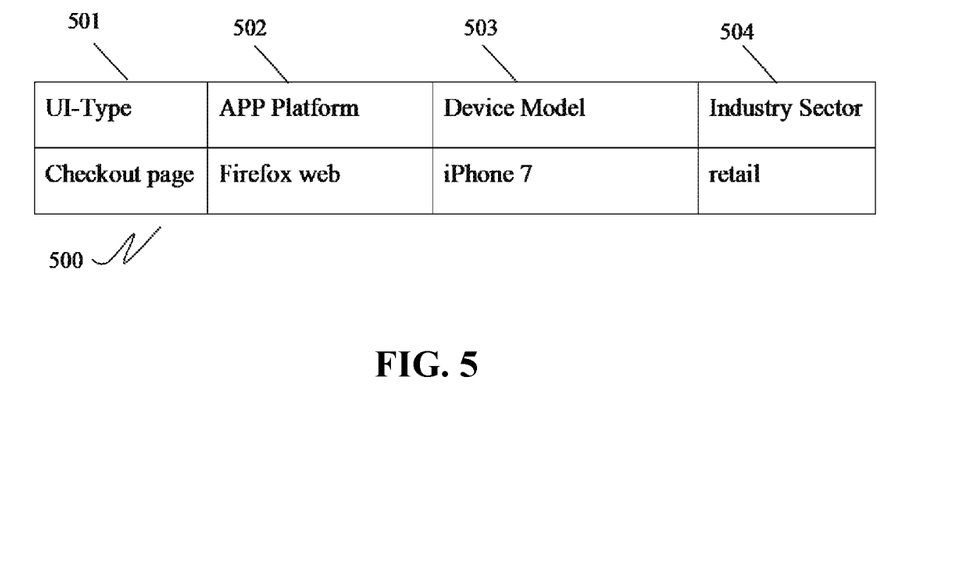
FIG. 5 depicts an example set of parameters of a computer environment according to some embodiments of the present disclosure.

As mentioned above, the historical information of past user sessions in a like computing environment refers to information or data aggregated for past user sessions that occurred in a computing environment that is similar to that of the current session. In this instance, the historical information of past user sessions in a like computing environment refers to the information aggregated for past user sessions in a computing environment complying with the parameters: <checkout page, Firefox web, iPhone 7, retail> for the current session, as shown in table 500.

The following paragraphs describe some embodiments of aggregating the information of past user sessions in a like computing environment and how to derive a baseline value for a gesture. Before that, assume that the baseline value derived from the information of past user sessions is 215%.

Following step 440, step 450 comprises determining whether the user gesture represents a user struggle based on the result of the comparison of the struggle factor score with the baseline value. In the instant example, at step 440 the struggle factor score for the slider gesture (slider ratio of 250%) is compared to the baseline value for the slider gesture (215%). Because the slider ratio is greater than the baseline value for the slider gesture, at step 450 of the method 400, it is determined that the slider gesture represents a user struggle. In response to determining that a user is struggling, or that a particular aspect of the GUI frequently encounters user struggles, the GUI may be modified. For example, if a GUI element is frequently mis-clicked (e.g., users try to click that element multiple times before successfully doing so), the GUI element may be enlarged or moved.

Embodiments of the general process of method 400 in FIG. 4 have been described. Further implementation details and examples will be described below. As stated in the description of step 440, the baseline value may be derived from the historical information of past user sessions in the like computing environment. The following paragraphs provide further details regarding how historical information may be aggregated and how baseline values may be derived for different gestures from the historical information.

Figure 6:
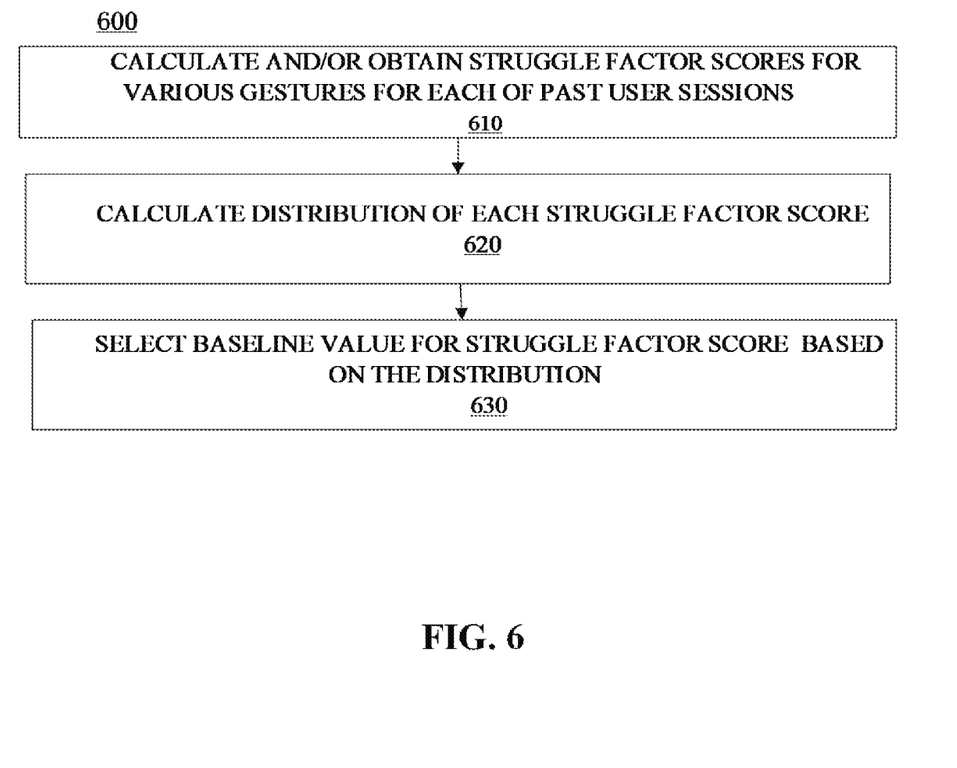
FIG. 6 is a flowchart of the general process of an example method for aggregating historical information according to some embodiments of the present disclosure.
Figure 8:
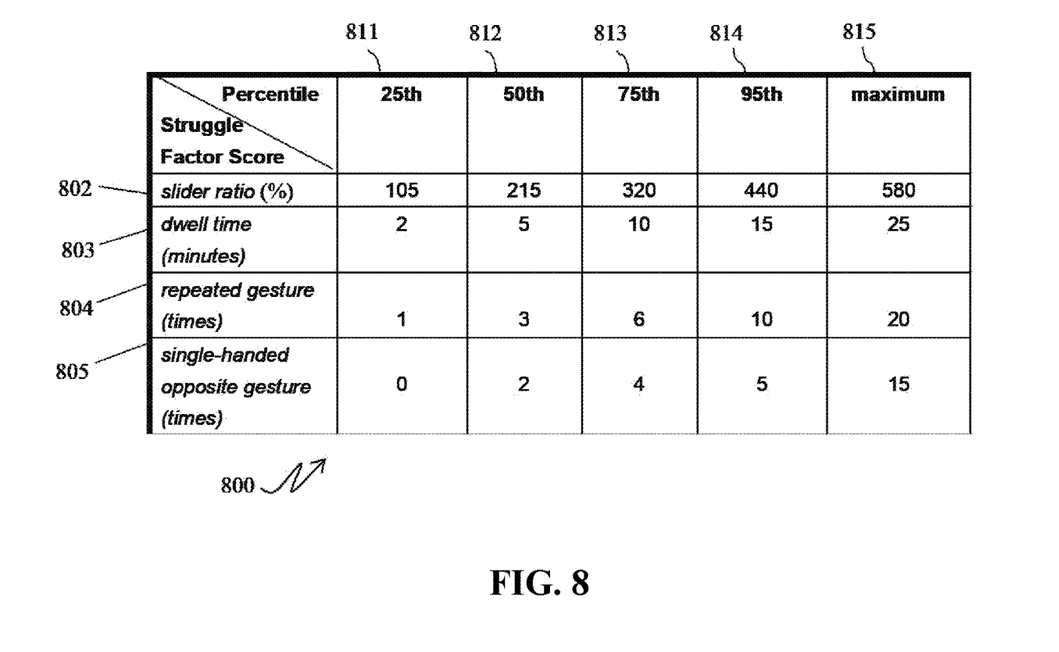
FIG. 8 is another table showing intermediate results of the method of FIG. 6 according to some embodiments of the present disclosure.

FIG. 6, described in further detail below, depicts a flowchart of the general process of a method 600 for aggregating historical information of past user sessions according to some embodiments of the present disclosure. FIG. 8, also described in further detail below, depicts another table 800 illustrating intermediate results of the performance of the method 600 of FIG. 6 according to some embodiments of the present disclosure.

Method 600 may be performed with respect to the historical information of past user sessions in a given computing environment. For example, given a computing environment as defined by parameters shown in table 500 in FIG. 5, the historical information of past user sessions may be aggregated in advance according to the given computing environment with a suitable aggregating algorithm. The aggregation may be made based on a given number of most recent days' incoming sessions, for example, and the aggregated historical information may be updated with the inclusion of any incoming sessions. The following steps may be carried out with respect to the aggregated historical information.

Step 610 comprises calculating and/or obtaining struggle factor scores for various types of gestures for each of the past user sessions associated with the given computing environment. The struggle factor scores for respective gestures may be calculated in the same or a similar manner as in step 430 of method 400. Alternatively, the struggle factor scores may be obtained directly if they have been calculated and stored for this or other purposes. Intermediate results of performance of the method 600, following performance of step 610, are illustratively shown in a table 700 in FIG. 7.

Figure 7:
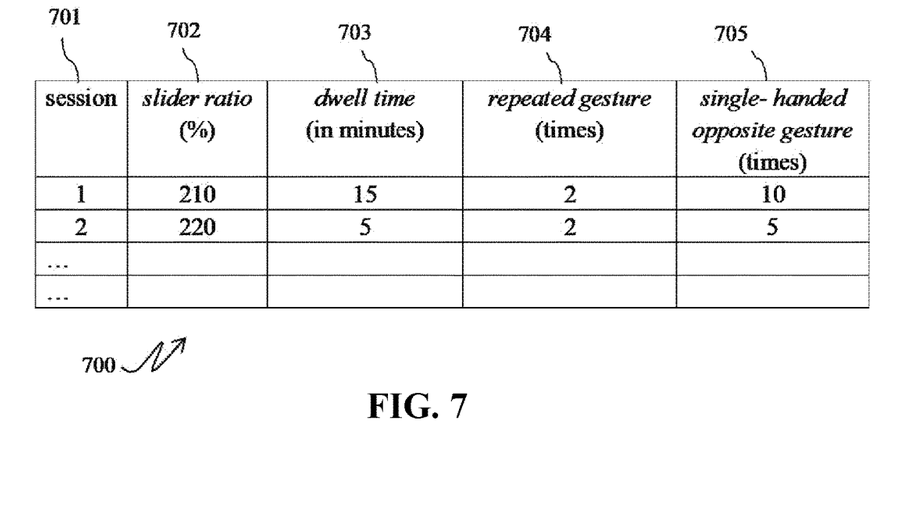
FIG. 7 is a table showing intermediate results of the method of FIG. 6 according to some embodiments of the present disclosure.

Table 700 shows calculated and/or obtained struggle factor scores for only two sessions, session 1 and session 2, as indicated in column 701. The columns 702, 703, 704 and 705 contain struggle factor scores: slider ratio, dwell time, repeated times and single-handed opposite gestures, respectively, for each of the sessions.

As shown, for session 1: the slider ratio is 210%; the dwell time is 15 minutes, indicating that the user's finger dwelt on an element (e.g., the whole form) in the UI (e.g., checkout page) for 15 minutes; the repeated gesture is 2 times, indicating that a gesture was repeated twice on some element in the checkout page; and the single-handed opposite gesture is 10 times, indicating that ten single-hand opposite operations were performed.

Analogously, for session 2: the slider ratio is 220%; the dwell time is 5 minutes; the repeated gesture is 2 times; and the single-handed opposite gesture is 5 times. Accordingly, such struggle factor scores may be calculated and stored as shown in FIG. 7 for all past user sessions available for analysis.

Following the calculation and/or obtention of struggle factor scores in step 610 of the method 600, the distribution of each struggle factor score is calculated in step 620, based on the result of step 610. More specifically, an overall percentile for each struggle factor score is calculated. The results of performance of step 620 are displayed in table 800 of FIG. 8. As shown, columns 811, 812, 813, 814 and 815 represent five percentiles (namely $25^{th}$, $50^{th}$, $75^{th}$, $95^{th}$, and maximum (e.g., $100^{th}$)), respectively, for each of the struggle factor scores. Rows 802, 803, 804 and 805 correspond with columns 702, 703, 704 and 705 of table 700. For example, column 812 of table 800 displays the $50^{th}$ percentiles of the struggle factor scores, and indicates that the slider ratio (shown in row 802) of 215 (percent) ranks in the $50^{th}$ percentile of the overall slider ratio scores. Similarly, the dwell time (shown in row 803) of 5 (minutes) ranks in the $50^{th}$ percentile of the overall dwell time scores. Analogously, column 813 of the table 800 displays the $75^{th}$ percentiles of the struggle factor scores, and indicates that the repeated gesture (shown in row 804) of 6 (times) ranks in the $75^{th}$ percentile of the overall repeated gesture scores, and that the single-handed opposite gesture (shown in row 805) of 4 (times) ranks in the $75^{th}$ percentile of the overall single-handed opposite gesture scores.

Following the distribution calculation of each struggle factor score in step 620 of the method 600, a baseline value for a struggle factor score is selected in step 630, based on the distribution calculated in step 620. For example, if the $50^{th}$ percentile is selected to define the baseline value, then corresponding struggle factor scores (from column 812 of the table 800) are: slider ratio of 215%; dwell time of 5 minutes; repeated gesture of 3 times; and single hand opposite gesture of 2 times. Therefore, in this example, the baseline value for the struggle factor score slider ratio is defined to be 215%.

The above examples illustrate that the baseline value may be defined or selected according to a distribution of struggle factor scores for the same or similar user gestures calculated from the historical information of past user sessions aggregated according to the computing environment. Further, the baseline value for a struggle factor score may be defined by a selected percentile in the distribution.

It is to be noted that the selection of the baseline value described above is only an illustrative, non-limiting example. Alternatively, the baseline value may be selected or defined according to a combination of several of the percentiles, for example, an average of the $50^{th}$ and $75^{th}$ percentiles.

Referring back to the method 400 shown in FIG. 4, as previously stated, if the struggle factor score is larger than the corresponding baseline value, then the user gesture is determined to represent a user struggle. In the instant example, wherein the user gesture is identified to be a slider gesture (in step 420), and the struggle factor score slider ratio is calculated to be 250% (in step 430), which is compared to the baseline value of 215% (in step 440), in step 450, the slider gesture is determined to represent a user struggle.

The determination resulting from step 450 of the method 400 may be used by UI designers, for example, to understand that there is a high probability that a user has experienced some kind of struggle due to the user's performance of an abnormal number or type of actions compared to historical user behaviors in like computing environments.

It is to be noted that in the above description, slider is taken as an example of user gesture. However, the principle of embodiments of the present disclosure may also be applicable to other types of user gesture.

Embodiments of the present disclosure provide a solution for detecting user struggles. The solution involves an unsupervised learning process for aggregating historical user interaction data, which may evolve struggle-judging criteria and identify struggling sessions automatically. Implementing embodiments of the present disclosure may enable or facilitate UI analysts providing analysis services to enterprises by comparing their apps with peer apps. Such comparisons may indicate to UI designers where to improve the apps for the enterprises in order to alleviate user struggles.

Embodiments of the present disclosure have been described above, particularly with respect to the detection of gesture struggles as an example. However, the principle of the present disclosure is by no means limited to the example. As noted above, those skilled in the art shall appreciate that, as design choices, a variety of equivalent or alternative methods and techniques in accordance with the principle of the present disclosure may be implemented for the operation of computing systems with configuration and protocol similar or equivalent to the exemplary mobile application. Therefore, those design choices shall be construed as falling into the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for the purpose of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to some embodiments and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method, comprising:
   obtaining, by at least one processor, data of user interaction with an application in a user session in a given computing environment;
   identifying, a user gesture interacting with a user interface of the application on a screen of a computing device based on the data;
   calculating, a struggle factor score for the user gesture based on the data;
   comparing, by at least one processor, the struggle factor score with a baseline value, wherein the baseline value corresponds to an average of a number of specific percentiles of a statistical distribution of historical information of past user sessions in a computer environment similar to the given computing environment; and
   determining, by at least one processor, that the user gesture indicates a user struggle in response to a determination that the struggle factor score is above the baseline value.

2. The computer implemented method of claim 1, wherein the computing environment is defined by at least one parameter selected from the group consisting of: type of the user interface; device model of the computing device; platform of the application; and industry sector of the application.

3. The computer implemented method of claim 2, wherein the at least one parameter is stored in association with the data of user interaction.

4. The computer implemented method of claim 1, wherein the struggle factor score is a measurement of struggle of an operation selected from the group consisting of: slider; dwelling; repeated gesture; and single-handed opposite gesture.

5. The computer implemented method of claim 1, wherein the baseline value is defined according to a distribution of struggle factor scores for similar user gestures calculated from the historical information of past user sessions aggregated according to the computing environment.

6. The computer implemented method of claim 5, wherein the baseline value represents a percentile that a corresponding struggle factor score ranks in the distribution.

7. A system, comprising:
   a computer-readable storage medium comprising instructions; and
   at least one processor operatively coupled to the computer-readable storage medium, the at least one processor configured such that, in response to executing the instructions, the at least one processor performs a method comprising:
   obtaining user interaction data for an application executing on a computing device in a given computing environment;
   identifying a user gesture on a user interface of the application based on the user interaction data;
   calculating a struggle factor score for the user gesture based on the user interaction data;
   comparing the struggle factor score with a baseline value, wherein the baseline value corresponds to an average of a number of specific percentiles of a statistical distribution of historical information of past user sessions in a computing environment similar to the given computing environment; and
   determining that a user is struggling with the user interface in response to a determination that the struggle factor score is above the baseline value.

8. The system of claim 7, wherein the computing environment is defined by at least one parameter selected from the group consisting of: type of the user interface; device model of the computing device; platform of the application; and industry sector of the application.

9. The system of claim 8, wherein the at least one parameter is stored in association with the user interaction data.

10. The system of claim 7, wherein the struggle factor score is a measurement of struggle of an operation selected from the group consisting of: slider; dwelling; repeated gesture; and single-handed opposite gesture.

11. The system of claim 7, wherein the baseline value is defined according to a distribution of struggle factor scores for similar user gestures calculated from the historical information aggregated according to the computing environment.

12. The system of claim 11, wherein the baseline value represents a percentile that a corresponding struggle factor score ranks in the distribution.

13. A computer program product comprising a computer-readable storage medium having program instructions embodied therewith, the program instructions executable by a processor such that the processor performs a method comprising:
   obtaining data of user interaction with an application in a user session in a given computing environment;
   identifying a user gesture interacting with a user interface of the application on a screen of a computing device based on the data;
   calculating a struggle factor score for the user gesture based on the data;
   comparing the struggle factor score with a baseline value, wherein the baseline value corresponds to an average of a number of specific percentiles of a statistical distribution of historical information of past user sessions in a computing environment similar to the given computing environment; and
   determining that the user gesture represents a user struggle in response to a determination that the struggle factor score is above the baseline value.

14. The computer program product of claim 13, wherein the computing environment is defined by at least one parameter selected from the group consisting of: type of the user interface; device model of the computing device; platform of the application; and industry sector of the application.

15. The computer program product of claim 14, wherein the at least one parameter is stored in association with the data of user interaction.

16. The computer program product of claim 13, wherein the struggle factor score is a measurement of struggle of an operation selected from the group consisting of: slider; dwelling; repeated gesture; and single-handed opposite gesture.

17. The computer program product of claim 13, wherein the baseline value is defined according to a distribution of struggle factor scores for same user gestures calculated from the historical information aggregated according to the computing environment.

18. The computer program product of claim 17, wherein the baseline value represents a percentile that a corresponding struggle factor score ranks in the distribution.

\* \* \* \* \*